(12) United States Patent
Chen

(10) Patent No.: US 8,184,158 B2
(45) Date of Patent: May 22, 2012

(54) CURVED MIRROR CAMERA

(76) Inventor: Kun-Sen Chen, Taipei (TW)

( * ) Notice: Subject to any disclaimer, the term of this patent is extended or adjusted under 35 U.S.C. 154(b) by 412 days.

(21) Appl. No.: 12/607,885

(22) Filed: Oct. 28, 2009

(65) Prior Publication Data

US 2011/0096163 A1 Apr. 28, 2011

(51) Int. Cl.
*H04N 7/18* (2006.01)
(52) U.S. Cl. ........................................................ 348/143
(58) Field of Classification Search ............ 348/143–152
See application file for complete search history.

(56) References Cited

U.S. PATENT DOCUMENTS

| | | | | |
|---|---|---|---|---|
| 7,413,357 B2* | 8/2008 | Badalian | ...................... | 396/427 |
| 7,969,503 B2* | 6/2011 | Sladen | .......................... | 348/371 |
| 8,107,808 B2* | 1/2012 | Messina et al. | ................ | 396/199 |
| 2009/0091619 A1* | 4/2009 | Rosemeyer et al. | .......... | 348/148 |

* cited by examiner

*Primary Examiner* — Moustafa M Meky
(74) *Attorney, Agent, or Firm* — Leong C. Lei

(57) ABSTRACT

The present invention discloses a curved mirror camera including an opaque housing, a single-sided curved reflector, a light-absorption hood and a camera. The opaque housing contains an opening, the single-sided curved reflector is assembled with the opaque housing to form an internal accommodation space, the light-absorption hood is collected in the accommodation space and the camera is collected in the accommodation space. The camera converts an image into an electronic signal for output and is further provided with a zoom lens by which a same photographing effect of shiny mirror reflection, high quality and high definition can be provided, so as to improve an issue in a conventional camera wherein a lens is always fixed.

10 Claims, 6 Drawing Sheets

CURVED MIRROR CAMERA

BACKGROUND OF THE INVENTION a) Field of the Invention

The present invention relates to a curved mirror camera, and more particularly to a curved mirror camera which is provided with a zoom lens.

b) Description of the Prior Art

As emerging of counter-terrorism, a surveillance camera apparatus has been very broadly applied, and in a daily life, the surveillance camera apparatus is indeed very important for fighting a crime and securing evidences. However, when using the aforementioned surveillance camera apparatus, following issues and shortcomings actually exist to be improved:

1. Referring to FIG. 1, it shows a three-dimensional view of a conventional surveillance camera. The surveillance camera 1 is usually installed at a location that is too clear. Although a criminal behavior can be deterred, it is actually easier to stop a man of integrity than a villain, as the villain will usually damage the surveillance camera 1 or hide from a lens before committing a crime to prevent crime scenes from being shot.
2. A conventional corner reflector which is installed at a location, such as an intersection of a curved road, a corner of a shopping mall, a U-turn place at a traffic lane of a community, is only used for auxiliary surveillance but is really not provided with the surveillance function, which has no physical help to collect evidences of an event, identify a truth and secure the evidences.
3. To cope with all kinds of on-site environments, the conventional surveillance camera should be sent back to an original manufacturer to calibrate and adjust every parameter and function by instruments, which wastes labor work and time.
4. The surveillance camera should be integrated into the existing reflector, which can avoid installing too many surveillance devices, mitigate constriction to people and improve the shortcomings of effects of all kinds of curved mirrors caused by difference of the curvature.

Accordingly, how to solve the aforementioned issues and shortcomings of the prior art is a direction of research and development for improvement by the present inventor and related vendors.

SUMMARY OF THE INVENTION

The primary object of the present invention is to provide a curved mirror camera which allows an image to be shot more clearly.

To achieve the aforementioned object, the present invention includes an opaque housing, a single-sided curved reflector, a light-absorption hood and a camera. The opaque housing is surrounded by a first connection part, the single-sided curved reflector is assembled with the opaque housing, a periphery of the single-sided curved reflector is provided with a second connection part which is assembled with the first connection part and the single-sided curved reflector is assembled with the opaque housing to form an interior accommodation space; whereas, the light-absorption hood is collected in the accommodation space. In addition, the camera is contained in the accommodation space, converts the image into an electronic signal for output and is provided with a zoom lens.

As a different curvature can result in different incident polarization and a different light reflection amplitude, a different mirror reflectivity and a different mirror effect will be formed, as well. The mirror reflectivity and the mirror effect are inversely proportional to transmittance; that is, the brighter the mirror effect is, the lower the transmittance will be. On the other hand, the transmittance is directly proportional to a camera effect; that is, the brighter the mirror effect is, the lower the transmittance will be, the smaller an exposure value of the camera will be and the worse the camera effect will be. The present invention is to improve the aforementioned issues and shortcomings by providing the zoom lens on the camera to effectively improve the camera effect. At a same time, the shiny mirror reflection and the camera effect of high quality and high definition are provided, which largely decreases a tangible cost and an intangible cost, expands a range of application and contributes to a society, thereby achieving the practical progressiveness that the conventional surveillance camera apparatus has not thought of.

Another object of the present invention is to provide a hidden-type camera.

As the present invention is only a corner reflector from appearance, people will not find out that the present invention is equipped with the photographing and surveillance functions. By the aforementioned technologies, the issue existing in the conventional surveillance camera apparatus that the surveillance camera is easily damaged by a person with indecent intention can be solved, thereby achieving the practical progressiveness of the hidden-type camera.

Still another object of the present invention is to provide a camera, all parameters of which can be controlled and adjusted more conveniently.

The camera of the present invention is able to receive plural instruction signals to adjust every parameter and function, wherein the parameter of the camera can be a color, chroma, brightness, contrast, a text, backlight compensation, white balance, an electronic shutter or a wide dynamic range of the camera, and the function of the camera can be an OSD (On Screen Display) operation function, zoom in and out, sync-focus, an RS-485 communication protocol or IP (Internet Protocol) remote control of image transmission, of the camera. By the aforementioned technologies, the parameters and functions of the camera can be adjusted and controlled by a wireless remote controller and the IP remote transmission, and an OSD menu of the parameters and the functions can be displayed on a screen, facilitating a user and an engineer to control and adjust the camera; this saves time and keeps from wasting labor work and labor hours by coming back and forth the place where the surveillance camera apparatus is installed, thereby achieving the practical progressiveness that the conventional surveillance camera apparatus has not thought of.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
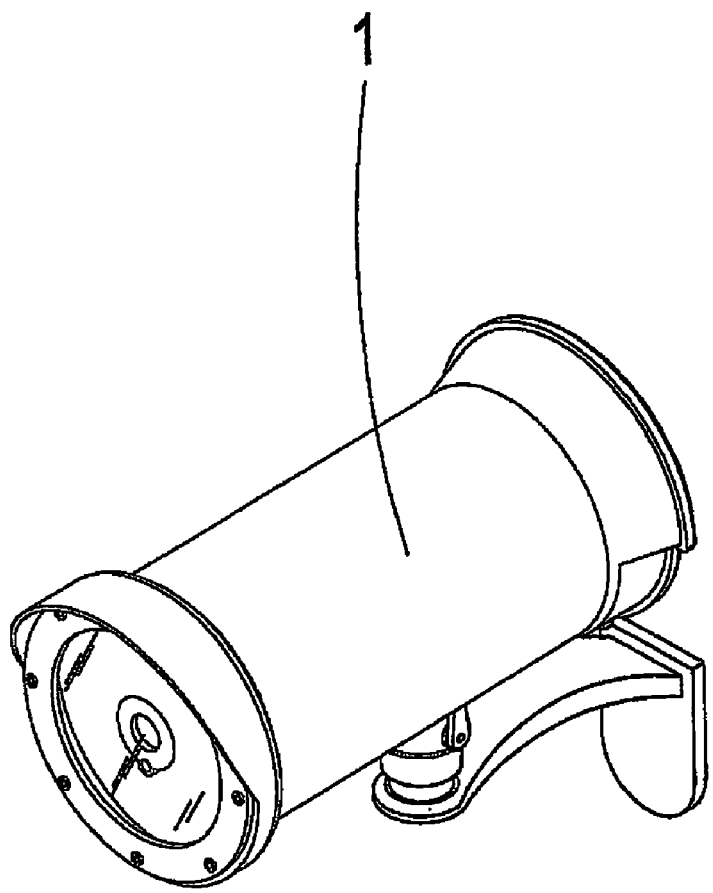
FIG. 1 shows a three-dimensional view of a conventional surveillance camera.
Figure 2:
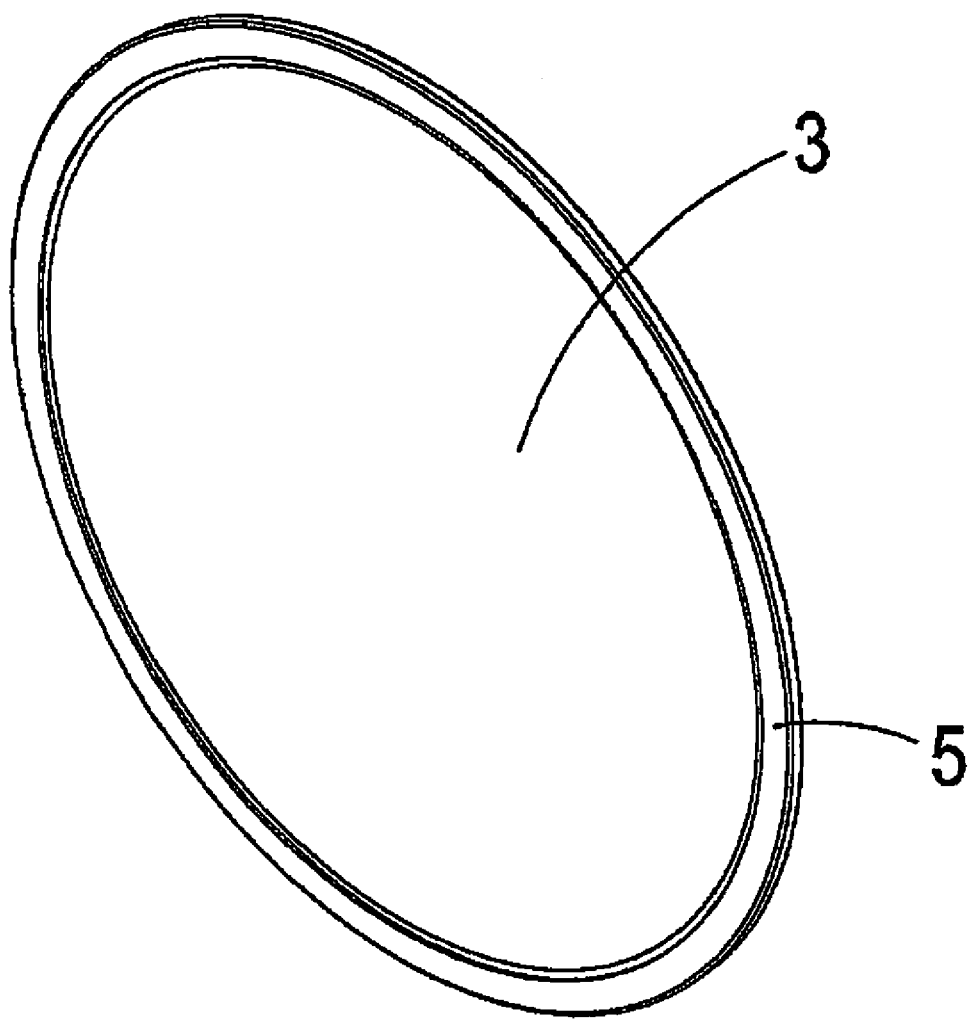
FIG. 2 shows a three-dimensional schematic view of a preferred embodiment of the present invention.
Figure 3:
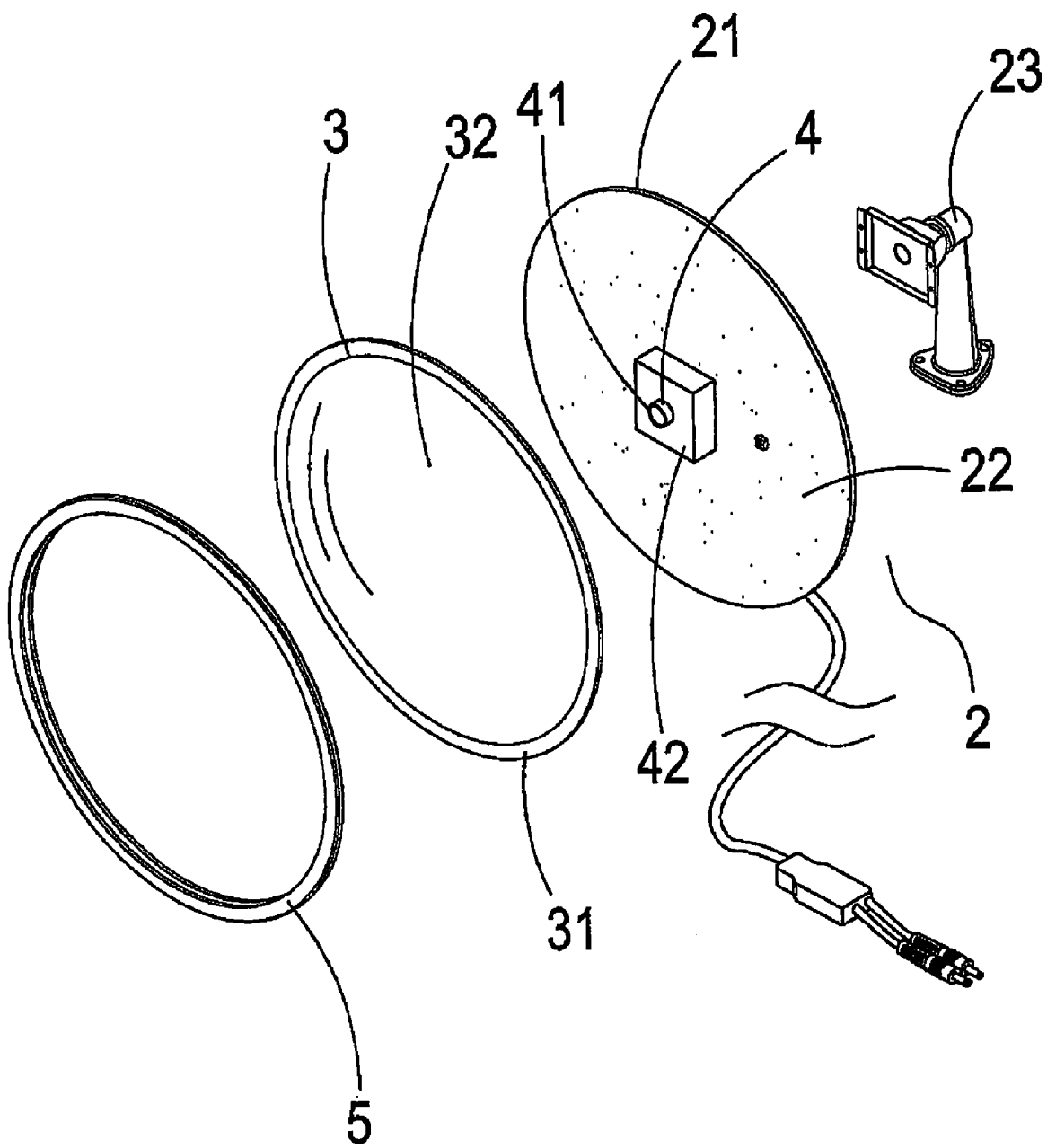
FIG. 3 shows a three-dimensional exploded view of the preferred embodiment of the present invention.
Figure 4:
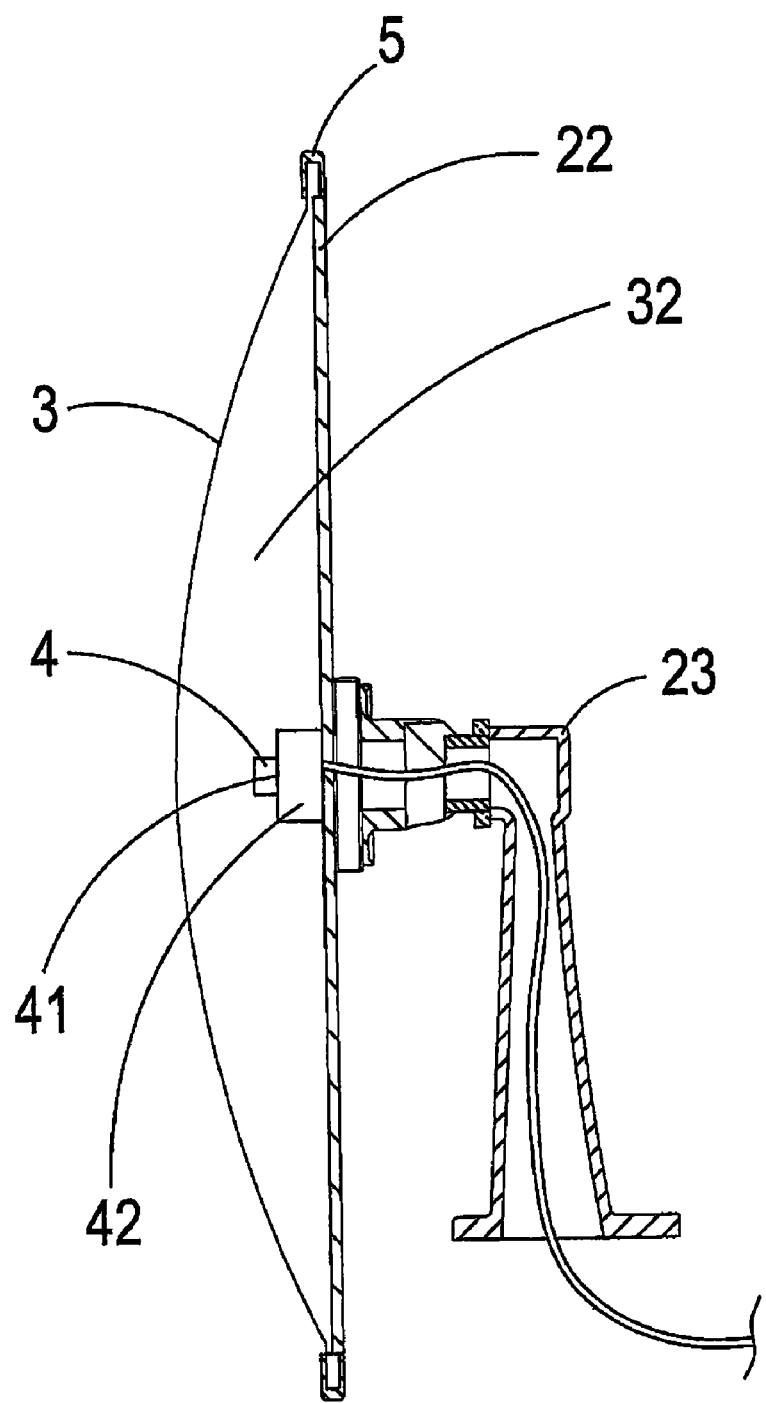
FIG. 4 shows a cutaway view of the preferred embodiment of the present invention.

Referring to FIGS. 2 to 4, it shows a three-dimensional schematic view, a three-dimensional exploded view and a cutaway view, of a preferred embodiment of the present invention. As shown in the drawings, the present invention comprises:

an opaque housing 2 which is surrounded by a first connection part 21 and is assembled with a bracket 23;

a single-sided curved reflector 3, which is assembled with the opaque housing 2, a periphery of which is provided with a second connection part 31 being assembled with the first connection part 21 as one unit by using a collar 5 and which is assembled with the opaque housing 2 to form an internal accommodation space 32, with transmittance of the single-sided curved reflector 3 being controlled to be at 4% to 20% and the single-sided curved reflector 3 being optically transparent PMMA (Polymethyl methacrylate) acryl, optically transparent PC (Polycarbonate) or optically transparent glass, allowing infrared at a wavelength of 800 nm to 980 nm to transmit from an inner side to an outer side;

a light-absorption hood 22 which is collected in the accommodation space 32 to absorb non-reflected incident light, parasitic light and a light amplitude; and a camera 4 which is collected in the accommodation space 32, converts an image into an electronic signal for output and is further provided with a zoom lens 41, with the camera 4 being able to receive plural instruction signals to control and adjust every parameter and function of the camera 4, the parameter being a color, brightness, contrast, a text, automatic gain control, white balance, backlight compensation or a wide dynamic range of the camera, and the function being an OSD operation, zoom in and out, sync-focus or an RS-485 communication protocol of the camera, which is controlled by a wireless remote controller and IP remote transmission.

Between the single-sided curved reflector 3 and the camera 4 is provided with a barrier cover 42 which can absorb incident polarization caused by a different curvature, secondary reflection light and a halo phenomenon caused by a reflection amplitude of light.

Figure 5:
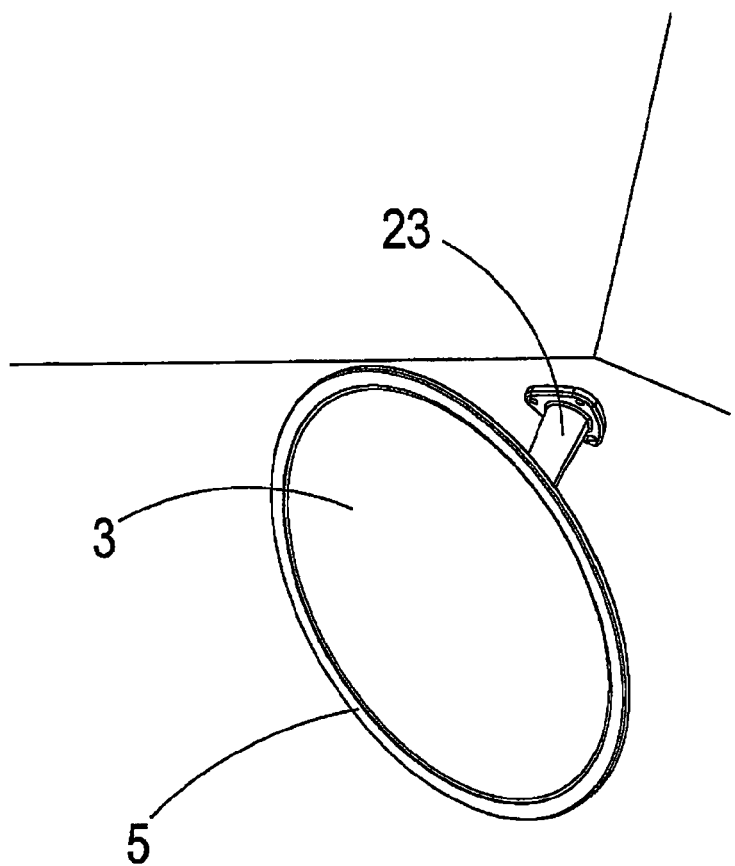
FIG. 5 shows a first schematic view of an implementation of the preferred embodiment of the present invention.
Figure 5:
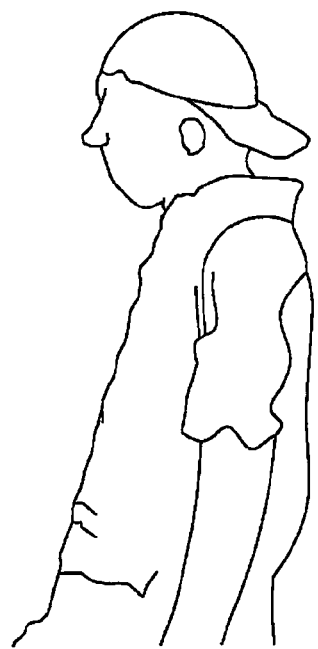
Figure 6:
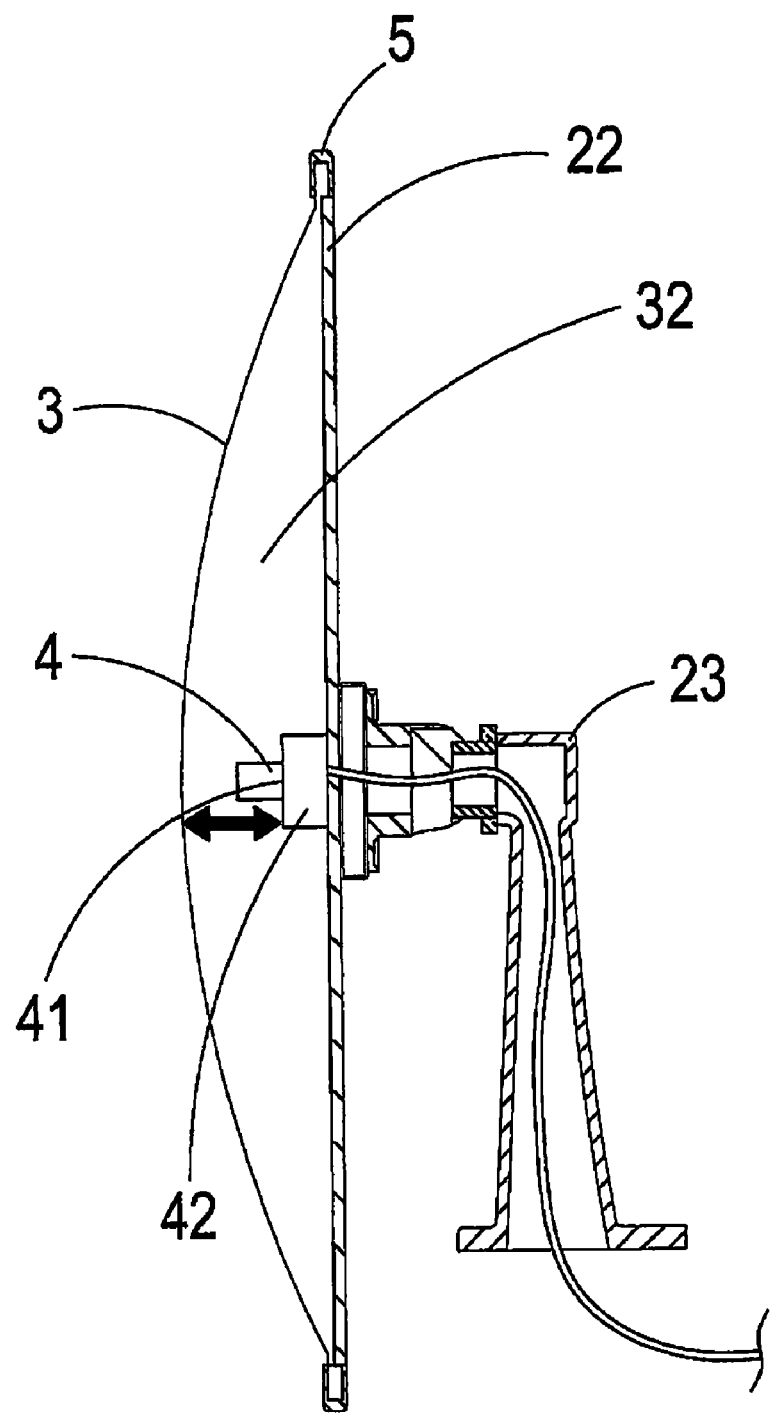
FIG. 6 shows a second schematic view of an implementation of the preferred embodiment of the present invention.

Referring to FIG. 3, FIG. 5 and FIG. 6, it shows a three-dimensional exploded view of the preferred embodiment, a first schematic view and a second schematic view of an implementation of the preferred embodiment, of the present invention. As shown in the drawings, as the present invention includes the single-sided curved reflector 3, people can only tell that the present invention is a corner reflector from appearance and will not find out that the present invention is equipped with photographing and surveillance functions. However, as a different curvature will result in different incident polarization and a different reflection amplitude of light, the different curvature will also cause a different mirror reflectivity and a different mirror effect. The mirror reflectivity and the mirror effect are inversely proportional to the transmittance; that is, the brighter the mirror effect is, the lower the transmittance will be. On the other hand, the transmittance is directly proportional to the effect of camera 4; that is, the brighter the mirror effect is, the lower the transmittance will be, the smaller an exposure value of the camera 4 will be and the worse the effect of camera 4 will be. Moreover, the camera 4 of the present invention contains the zoom lens 41 by which focusing can be carried out according to a real need of shooting, which can effectively improve the effect of photographing, thereby providing the same effect of photographing having the shiny mirror reflection, high quality and high definition. This will largely reduce a tangible cost and an intangible cost, expand an application range and contribute to a society, such that the practical progressiveness is achieved that the conventional surveillance camera has not thought of.

Furthermore, the camera 4 of the present invention can receive plural instruction signals to adjust every parameter and function of the camera 4, wherein the parameter of the camera 4 can be the color, chroma, the brightness, the contrast, the text, the backlight compensation, the white balance, an electronic shutter or the wide dynamic range of the camera; whereas, the function of the camera 4 can be the OSD operation, the zoom in and out, the sync-focus, the RS-485 communication protocol or IP remote control of image transmission of the camera. By the aforementioned technologies, the present invention can use a wireless remote controller and IP remote transmission to control and adjust the parameters and the functions of the camera 4, as well as display an OSD menu of the parameters and the functions on a screen, allowing a user and an engineer to control and adjust the camera 4 more conveniently.

Besides, the camera 4 of the present invention can be connected to internet, such that the user can utilize internet to remotely control every function of the camera 4, thereby achieving effects of remotely monitoring and adjusting the camera 4.

Accordingly, referring to all the drawings, the present invention is indeed provided with following advantages in comparison with the prior art.

The camera 4 of the present invention includes the zoom lens 41 by which the focusing can be carried out according to the real need of shooting, so as to effectively improve the photographing effect, thereby providing the same photographing effect of shiny mirror reflection, high quality and high definition. This can largely reduce the tangible cost and the intangible cost, expand the application range, contribute to the society and improve the issue existing in the conventional camera that the lens is always fixed.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A curved mirror camera comprising:
   an opaque housing which is surrounded by a first connection part;
   a single-sided curved reflector, which is assembled with the opaque housing, a periphery of the single-sided curved reflector is provided with a second connection part assembled with the first connection part and which is assembled with the opaque housing to form an interior accommodation space;
   a light-absorption hood which is collected in the accommodation space;
   a camera, which is collected in the accommodation space, coverts an image into an electronic signal for output and is further provided with a zoom lens.

2. The curved mirror camera according to claim 1, wherein between the single-sided curved mirror and the camera is provided with a barrier cover which absorbs incident polarization caused by a different curvature, secondary reflection light and a halo phenomenon caused by a reflection amplitude of light.

3. The curved mirror camera according to claim 1, wherein the camera receives plural instruction signals to control and adjust every parameter and function of the camera.

4. The curved mirror camera according to claim 3, wherein the parameter is a color, brightness, contrast, a text, automatic gain control, white balance, backlight compensation or a wide dynamic range of the camera; whereas, the function is an OSD (On Screen Display) operation, zoom in and out, sync-focus or an RS-485 communication protocol of the camera, which is controlled by a wireless remote controller and IP (Internet Protocol) remote transmission.

5. The curved mirror camera according to claim 1, wherein transmittance of the single-sided curved mirror is controlled to be at 4% to 20%.

6. The curved mirror camera according to claim 1, wherein the single-sided curved reflector is optically transparent PMMA (Polymethyl methacrylate) acryl, optically transparent PC (Polycarbonate) or optically transparent glass.

7. The curved mirror camera according to claim 1, wherein the single-sided curved reflector allows infrared at a wavelength of 800 nm to 980 nm to transmit from an inner side to an outer side.

8. The curved mirror camera according to claim 1, wherein the camera is further provided with IR-LED (Infrared-Light Emitting Diode) night vision equipment.

9. The curved mirror camera according to claim 1, wherein the first connection part and the second connection part are assembled as one unit using a collar.

10. The curved mirror camera according to claim 1, wherein the housing is assembled with a bracket.

* * * * *